United States Patent
Carlay, II et al.

(10) Patent No.: US 10,352,482 B2
(45) Date of Patent: Jul. 16, 2019

(54) INSULATED DUCT WITH AIR GAP AND METHOD OF USE

(71) Applicant: FLEXIBLE TECHNOLOGIES, INC., Abbeville, SC (US)

(72) Inventors: Ronald L. Carlay, II, Laurens, SC (US); John Cullen Schlageter, Greenwood, SC (US); Donald B. Campbell, Greenwood, SC (US)

(73) Assignee: FLEXIBLE TECHNOLOGIES, INC., Abbeville, SC (US)

( * ) Notice: Subject to any disclaimer, the term of this patent is extended or adjusted under 35 U.S.C. 154(b) by 122 days.

(21) Appl. No.: 15/359,898

(22) Filed: Nov. 23, 2016

(65) Prior Publication Data

US 2017/0146157 A1    May 25, 2017

Related U.S. Application Data (60) Provisional application No. 62/258,607, filed on Nov. 23, 2015.

(51) Int. Cl.
| | | |
|---|---|---|
| *F16L 11/08* | (2006.01) | |
| *F16L 59/153* | (2006.01) | |
| *F16L 11/02* | (2006.01) | |
| *F16L 11/12* | (2006.01) | |
| *F24F 13/02* | (2006.01) | |

(52) U.S. Cl.
CPC .............. *F16L 11/081* (2013.01); *F16L 11/02* (2013.01); *F16L 11/12* (2013.01); *F16L 59/153* (2013.01); *F24F 13/0218* (2013.01); *F24F 13/0263* (2013.01)

(58) Field of Classification Search
CPC .......................... F24F 13/0218; F24F 13/0263
USPC ..................... 138/114, 137, 140, 149, DIG. 4
See application file for complete search history.

(56) References Cited

U.S. PATENT DOCUMENTS

| | | | | |
|---|---|---|---|---|
| 1,838,242 A | * | 12/1931 | Wilson .................... | F16L 59/07 138/115 |
| 2,508,774 A | * | 5/1950 | Roberts .................... | A47L 9/24 138/111 |
| 3,216,459 A | * | 11/1965 | Schroeder ............... | F16L 11/02 138/131 |
| 3,565,118 A | * | 2/1971 | Stearns ................. | F16L 59/125 138/112 |
| 3,565,120 A | * | 2/1971 | Bennett ................. | F16L 59/153 138/147 |
| 3,568,722 A | * | 3/1971 | Runshe ................. | F16L 59/153 138/109 |
| 3,596,936 A | * | 8/1971 | Dieckmann ........... | F16L 37/008 285/136.1 |
| 3,826,286 A | * | 7/1974 | Beck ....................... | F16L 59/08 138/114 |
| 3,974,862 A | * | 8/1976 | Fuhrmann ................ | F16L 9/21 138/37 |
| 4,351,365 A | | 9/1982 | Bauermeister et al. | |
| 4,805,355 A | | 2/1989 | Plant | |

(Continued)

*Primary Examiner* — Craig M Schneider
*Assistant Examiner* — David R Deal
(74) *Attorney, Agent, or Firm* — Clark & Brody (57) ABSTRACT

A flexible air duct contains a uniformly-spaced reflective insulation system, with or without bulk insulation, a liner, and an outer jacket that would allow a reduced amount or no amount of bulk insulation to be used to obtain a desired R-value insulation. The flexible air duct can be used to move conditioned air to one or more desired locations.

10 Claims, 6 Drawing Sheets

(56) References Cited

U.S. PATENT DOCUMENTS

| | | | |
|---|---|---|---|
| 4,990,143 A | | 2/1991 | Sheridan |
| 5,526,849 A | | 6/1996 | Gray |
| 5,607,529 A | * | 3/1997 | Adamczyk ............ B29C 53/582 |
| | | | 138/149 |
| 5,727,599 A | * | 3/1998 | Fisher .................... F16L 57/00 |
| | | | 138/110 |
| 5,785,091 A | | 7/1998 | Barker |
| 6,158,477 A | | 12/2000 | Waters |
| 6,234,163 B1 | * | 5/2001 | Garrod .................... F16L 11/20 |
| | | | 126/307 R |
| 7,574,830 B2 | | 8/2009 | Baker |
| 2007/0131299 A1 | | 6/2007 | Kornbleet |
| 2010/0186846 A1 | | 7/2010 | Carlay, II et al. |
| 2010/0282356 A1 | * | 11/2010 | Sawyer, Sr. ............. F16L 11/14 |
| | | | 138/149 |
| 2015/0090360 A1 | | 4/2015 | Carlay, II |
| 2015/0192318 A1 | * | 7/2015 | Heim .................. F24F 13/0218 |
| | | | 138/107 |
| 2015/0204573 A1 | * | 7/2015 | Gray .................. F24F 13/0263 |
| | | | 428/43 |

\* cited by examiner

INSULATED DUCT WITH AIR GAP AND METHOD OF USE

This application claims priority under 35 USC 119(e) based on provisional application No. 62/258,607, filed on Nov. 23, 2015.

FIELD OF THE INVENTION

The invention relates to a flexible air duct that contains a uniformly-spaced reflective insulation system, with or without bulk insulation, a liner, and an outer jacket that would allow a reduced amount or no amount of bulk insulation to be used.

BACKGROUND ART

The construction of factory-made flexible HVAC ducts is well known in the industry. These types of ducts usually comprise a helical-supported duct liner (sometimes referred to as the liner or inner liner) covered by a layer of fiberglass insulation, which is, in turn, covered by a scrim-reinforced PET vapor barrier or a PE-film vapor barrier. Scrim is a woven material that adds strength to a laminate construction when made a part thereof. U.S. Pat. Nos. 6,158,477 and 5,785,091 show typical constructions of factory made ducts. U.S. Pat. No. 5,785,091 teaches that the duct liner and vapor barrier can be manufactured from polymer films, particularly polyester. U.S. Pat. No. 5,526,849 discloses a plastic helical member in combination with a metal helical member and U.S. Pat. No. 4,990,143 discloses a polyester helix. United States Patent Publication No. 2007/0131299 discloses a polyester scrim used in a vapor barrier (outer jacket).

In the prior art, factory-made flexible HVAC ducts are typically constructed of three main components; a duct liner for conveying air, a layer of insulation for preventing energy loss through the duct wall, and a vapor barrier for holding the fiberglass around the liner while protecting the fiberglass from moisture. The duct liner is commonly constructed of a steel wire sandwiched between layers of polyester (PET) film. Other plastics and coated fabrics are also used to construct the wall of the duct liner. United States Published Patent Application No. 2010/0186846 to Carlay et al. is another example of flexible duct and it is incorporated in its entirety herein.

Another example of a prior art duct is that shown in United States Published Patent Application No. 2015-0090360 to Carlay II. This duct has an inflatable jacket to create an air space around the duct core or liner to reduce the amount of bulk insulation in the duct without reducing the overall insulating value of the duct. While this duct is advantageous in terms of its insulating value, it has some drawbacks in terms of manufacture to create the inflatable jacket.

In the HVAC industry, ductwork is often times specified to have a certain thermal resistance or R value for a particular application. For example, if the ductwork is to run in an unconditioned space, the R value must be at least 6.0. Current North American flexible duct fiberglass R-values are R4.2, R6.0 and R8.0 and each may be purchased pre-certified from fiberglass manufacturers. Obviously, the cost of the ductwork increases from one that has an R6.0 value to an R8.0 value due to the need to provide additional insulation, which is generally fiberglass insulation.

In the HVAC industry, the fundamentals of heat transfer and the like are explained in the ASHRAE Handbook of Fundamentals (the Handbook), which is currently in a 2013 edition. Included in this Handbook is the recognition of reflective insulation systems, which combines a reflective insulation and an enclosed air space bounded within a particular assembly, see page 26.12 of the Handbook. The Handbook also recognize the effect of thermal resistance as it relates to a particular size air space and the direction of heat flow, e.g. up, down, oblique up or down, etc., see pages 26.13 and 26.14. What these pages generally show is that an increase in thermal resistance occurs when the air space or air gap increases and that the thermal resistance is the least when the heat flow is in the up direction.

It is known to provide an HVAC duct that uses a free floating liner to create. However, there is always a need to provide improved duct designs in the HVAC industry and other areas where air or fluid handling is necessary. The present invention responds to this need by providing an improved insulated duct.

SUMMARY OF THE INVENTION

One object of the invention is to provide a flexible insulated duct that provides improved performance over existing ducts, which are typically used in HVAC applications.

Another object of the invention is to provide a method of moving conditioned air using the inventive flexible insulated duct.

One feature of the inventive duct is a spacer system that creates a uniform airgap as part of reflective insulation system of the duct.

The inventive insulated flexible duct comprises a liner, a reflective insulation system surrounding the liner, and at least one jacket surrounding the reflective insulation system. The reflective insulation system further comprises at least one low emissivity reflective surface and at least one spacer system positioned between the liner and the jacket, the spacer system creating a generally uniform air gap between an outer surface of the liner and the inner surface of the jacket to create additional R value for the flexible insulated duct.

The spacer system may include a number of different designs to create the generally uniform air gap. One such design is a star-shaped spiral helix positioned between the outer surface of the liner and the inner surface of the at least one jacket to create the generally uniform air gap between the outer surface of the liner and the inner surface of the at least one jacket. The star-shaped spiral helix can be attached or unattached to the liner and/or to the at least one jacket.

Another design of the spacer system is an expandable lattice blanket positioned between the outer surface of the liner and the inner surface of the at least one jacket to create the generally uniform air gap between the outer surface of the liner and the inner surface of the at least one jacket.

Yet another design for the spacer system is a plurality of spaced-apart staves, each spaced-apart stave extending from the outer surface of the liner to create the generally uniform air gap between the outer surface of the liner and the inner surface of the at least one jacket.

One further design for the spacer system is a lattice cord and post blanket assembly surrounding the outer surface of the liner. Tensioning of the lattice cord of the lattice cord and post blanket assembly causing posts thereof to orient in a generally perpendicular direction with respect to the outer surface of the liner to create the generally uniform air gap between the outer surface of the liner and the inner surface of the at least one jacket.

The flexible insulated duct can include at least one bulk insulating layer. This layer can be positioned between an outer periphery of the at least one spacer system and the inner surface of the jacket such that the generally uniform air gap is created between the outer surface of the liner and an inner surface of the at least one bulk insulating layer. Alternatively, the at least one bulk insulating layer can be positioned between an outer periphery of the liner and an inner periphery of at least one spacer system such that the generally uniform air gap is created between an outer surface of the at least one bulk insulating layer and an inner surface of the at least one jacket.

In another embodiment, a plurality of the at least one spacer system and the at least one jacket can be arranged to create a plurality of generally uniform air gaps.

For the spacer system using the expandable lattice blanket, it can be made of a sheet of foam with openings therein wherein expansion of the sheet of foam creates lattice openings or strips of foam connected together at spaced apart locations to create the lattice openings.

For the spacer system using the staves, each of the spaced apart staves are attached at one end thereof to the outer surface of liner such that when the liner is expanded, free ends of the spaced apart staves extend away from the outer surface of the liner to create the generally uniform air gap and when the liner is compressed, ends of the spaced apart move toward the outer surface of the liner.

The liner can comprise a pair of polymer films, one polymer film forming an inner surface of the liner and the other polymer film forming the outside surface of the liner. Optionally, a helical member can be disposed between the polymer films.

The jacket can comprise either two layers of polyester film that are adhered together, the two layers encapsulating a scrim blanket therebetween or a continuous tube of polyethylene material.

The at least one low emissivity surface is on either an inner surface of the at least one jacket or the outer surface of the liner.

The invention also includes a method of supplying conditioned air to a space using the inventive flexible insulated duct.

DETAILED DESCRIPTION OF THE INVENTION

The present invention provides a number of different ways to create a uniform spaced reflective insulation system as part of an HVAC duct that comprises a liner, the reflective insulation system surrounding the liner, and at least one jacket surrounding the reflective insulation system. The reflective insulation system further comprises at least one low emissivity reflective surface. The at least one spacer system is positioned between the liner and the jacket. The spacer system creates a generally uniform air gap between an outer surface of the liner and the inner surface of the jacket to create additional R value for the flexible insulated duct. The R-value of the duct can be enhanced by using one or more bulk insulation layers as part of the duct.

Figure 1:
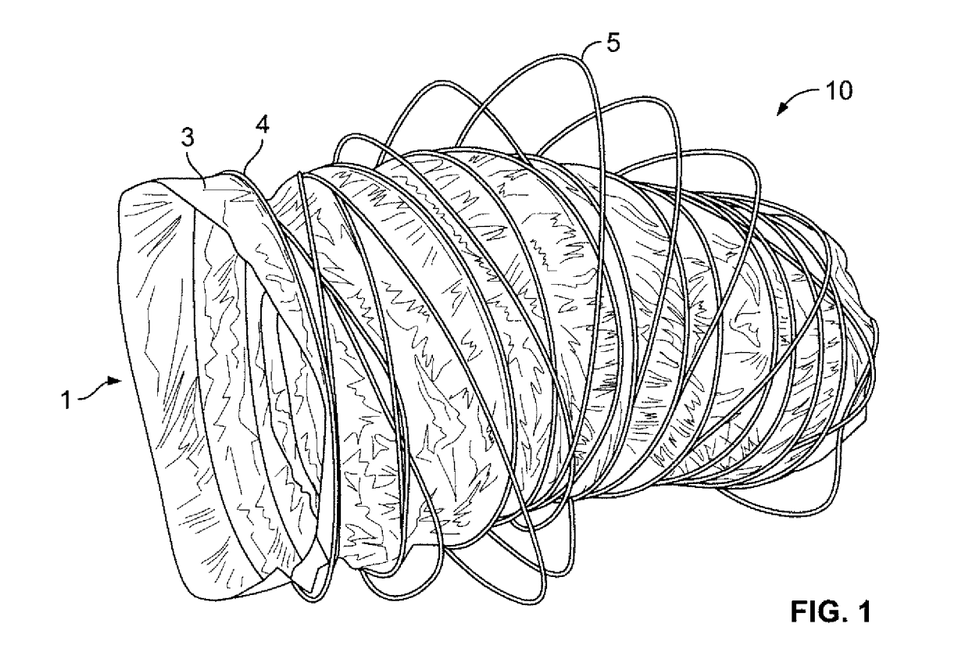
FIG. 1 is a perspective view of one embodiment of the invention showing a star-shaped helical member to create the generally uniform air gap for the duct.
Figure 2:
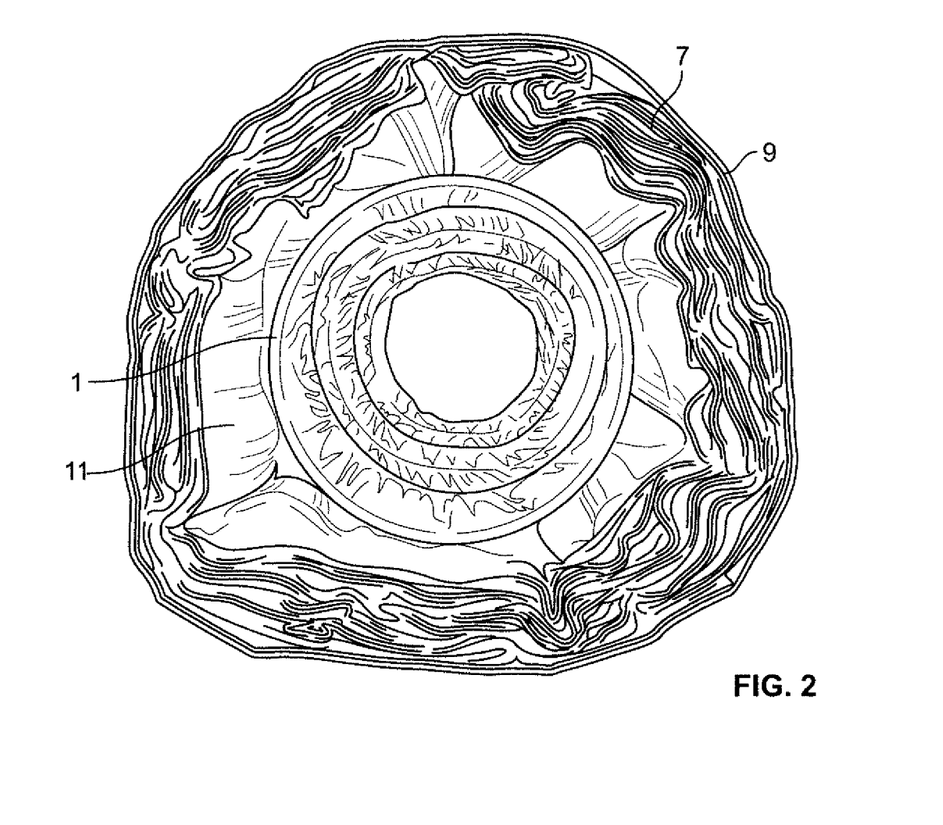
FIG. 2 is an end view of the arrangement of FIG. 1 surrounded by bulk insulation and an outer jacket.

One of the spacer systems has a star helix construction. With reference to FIGS. 1 and 2, this design is designated by the reference numeral 10 and comprises an inner liner 1 shown in FIG. 1 with a low emissivity reflective outer surface 3 (hereinafter low-e surface). An example of a liner construction is a pair of polymer films, one polymer film forming an inner surface of the liner and the other polymer film forming the outside surface of the liner and, optionally a helical member disposed between the polymer films. In the FIG. 1 embodiment, a helical member 4 is shown as part of the liner 1. Any type of conventional liner can be used as part of the duct.

A formed star-shaped spiral wire helix 5 is wrapped around the liner 1 and is locked in place with a set pitch between wire flights. The star formation creates uniform spiral support sections as shown in FIG. 1.

A blanket of fiberglass bulk insulation 7 can be then wrapped around the liner and star helix as shown in FIG. 2. An outer jacket 9 is then pulled over the construction to hold the insulation in place. An example of a jacket is either two layers of polyester film that are adhered together, the two layers encapsulating a scrim blanket therebetween or a continuous tube of polyethylene material. As with the liner, any type of outer jacket known for use in flexible insulated ducts can be employed as part of the duct.

The generally uniform air gap compartment created by the spiraling star helix is indicated by reference numeral 11.

Although not illustrated, the star helix design may also be utilized between the fiberglass bulk insulation 7 and the outer jacket 9, with the inner surface of the jacket having the low-e surface. The air gap in this embodiment created by the star-shaped spiral wire helix 5 resides between the outer surface of the bulk insulation 7 and the inner surface of the jacket 9.

The creation of a uniformly-spaced air gap as part of the insulated duct provides a number of benefits. The spaced reflective insulation system creates additional R value that is independent of the fiberglass bulk insulation. This design can also be utilized with or without the fiberglass bulk insulation.

This design can be used to create multiple layers of radiant air gaps with flexible air ducts by employing more than one star-shaped spiral helix and creating more than one air gap.

The construction allows for the air duct to be compressed and packaged in a reduced size to the customer without being damaged. The star-shaped spiral helix provides added crush resistant support to the air duct construction. The presence of the air gap allows the compressed air duct to recovery more quickly once removed from the compressed state in the package.

This embodiment provides a lighter weight design compared to the same R value with standard fiberglass bulk insulation. The star-shaped spiral helix may be recycled at the end use of product and can be made of any material, metallic or non-metallic.

Figure 3:
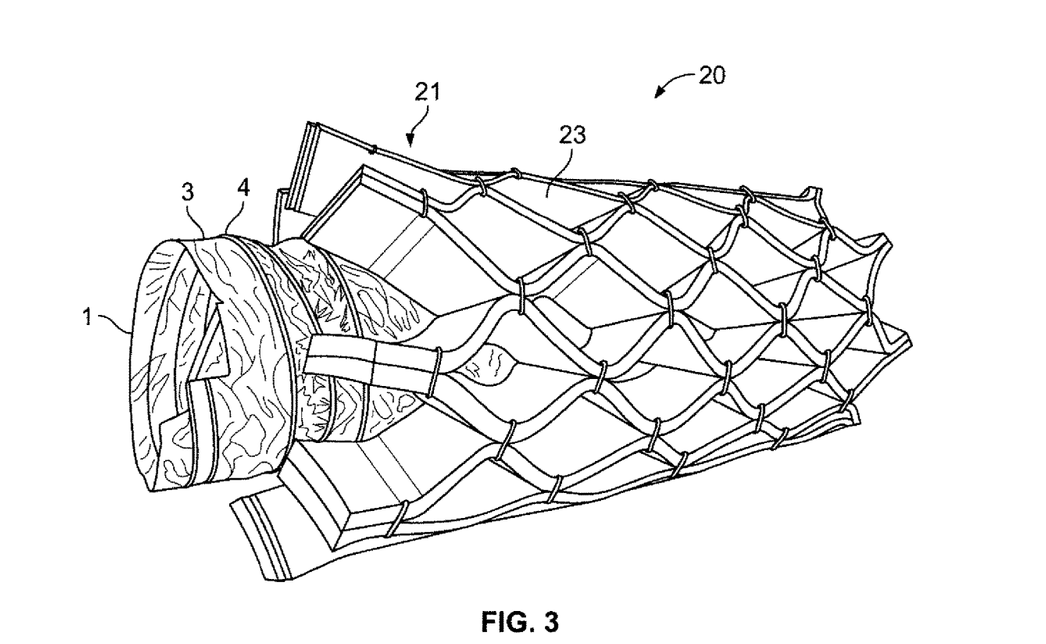
FIG. 3 is a perspective view of a second embodiment of the invention showing the liner of FIG. 1 with a lattice construction to create the generally uniform air gap.
Figure 4:
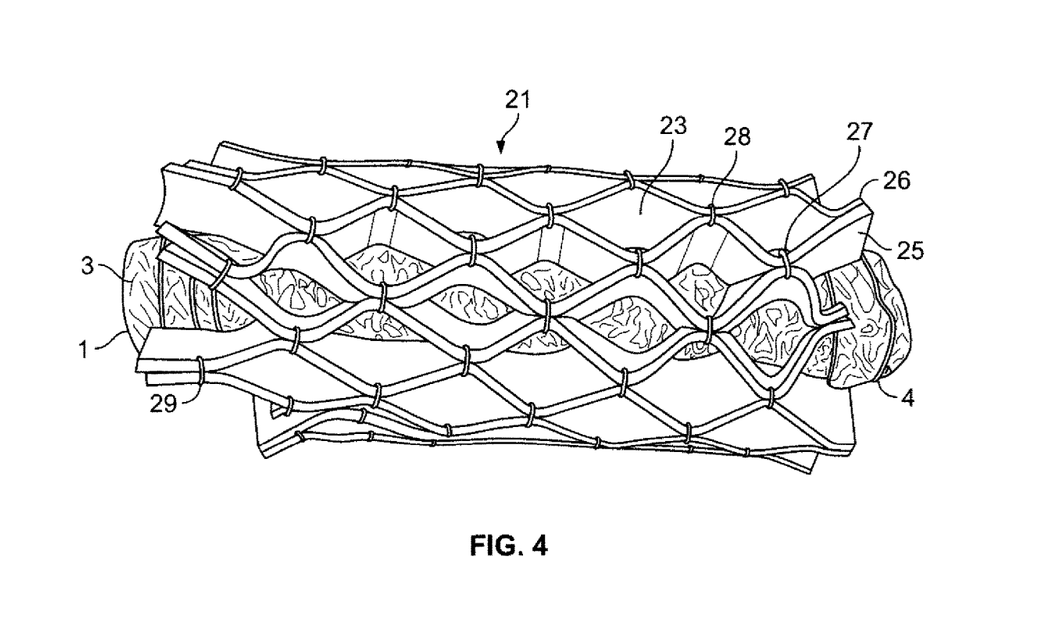
FIG. 4 is a side perspective view of the duct of FIG. 3.

With reference to FIGS. 3 and 4, a second reflective insulation system that can be used instead of the star-shaped spiral helix is designated as 20 and comprises a lattice construction. This design employs the same inner liner 1 shown in FIG. 1 with its low-e reflective outer surface 3. An expandable lattice blanket 21 is wrapped around the liner forming a plurality of air pocket compartments 23 as it is stretched and pulled tight in all directions as shown in FIGS. 3 and 4.

The lattice blanket formation creates a uniform compartmentalized air gap around the liner as a result of the formation of the plurality of pockets 23. The lattice blanket can be made with different foam and/or plastic materials. The lattice blanket can be constructed several different ways: cutting slits into a sheet of foam allowing it to expand once pulled, connecting strips of plastic or foam in various spots so that when pulled the blanket stands upright as shown in FIGS. 3 and 4.

Still referring to FIGS. 3 and 4, the lattice design has a number of segments 25 that merge at one connection point 27, then diverge from the one connection point 27 to merge with another segment 26 at another connection point 28 so as to create the lattice design. The connection points 27 and 28 can be formed using any connection technique, e.g., a fastener like a staple 29, an adhesive, or the like.

Although not shown, a blanket of fiberglass bulk insulation can then be wrapped around the liner 1 and lattice blanket 21. An outer jacket is then pulled over the construction to hold the insulation in place. The use of the bulk insulation and outer jacket is the same as for the FIG. 1 embodiment so that the insulation and outer jacket for the lattice embodiment do not require illustration.

The lattice design may also be utilized between the fiberglass bulk insulation and the outer jacket, with the inner surface of the jacket having the low-e surface.

The lattice design has a number of benefits including that the spaced reflective insulation system created by the lattice design creates an additional R value that is independent of the fiberglass bulk insulation. This design can be utilized with or without the fiberglass bulk insulation. This design can be used to create multiple layers of radiant air gaps for flexible air ducts. The construction allows for the air duct to be compressed and packaged in a reduced package to the customer without being damaged. The presence of the air gap allows the air duct in the compressed state to recovery quicker once removed from the compressed state in the package. The design also provides a lighter weight design compared to the same R value with standard fiberglass bulk insulation. The material used to create the space can be recycled at the end use of product.

Figure 5:
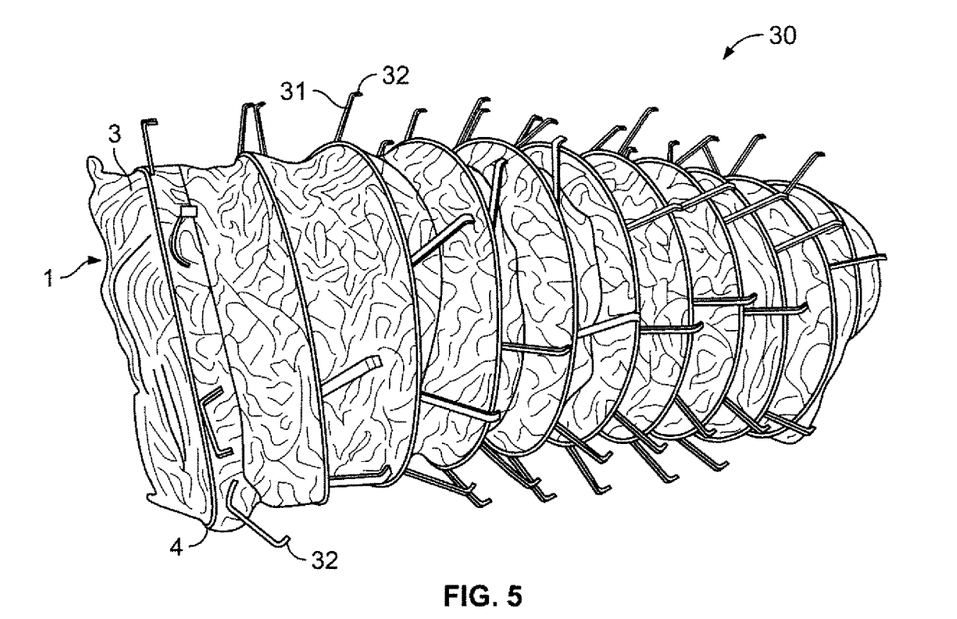
FIG. 5 is a perspective view of a third embodiment of the invention showing the liner of FIG. 1 and a plurality of staves to create the generally uniform air gap of the duct.
Figure 6:
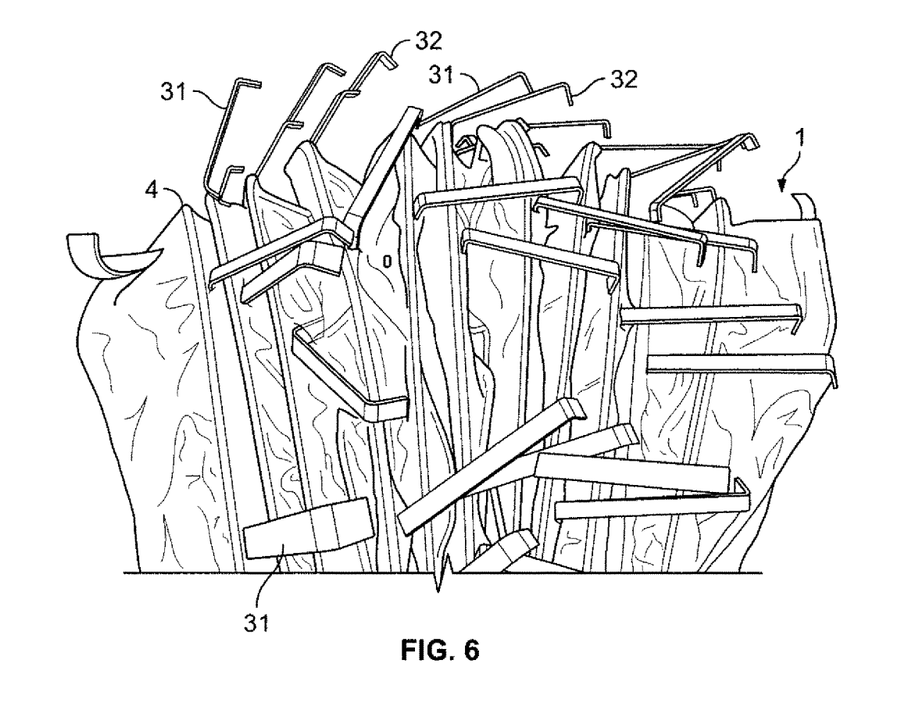
FIG. 6 is a side perspective view of the duct of FIG. 5 in a more compressed or collapsed state to show the change in the orientation of the staves.
Figure 7:
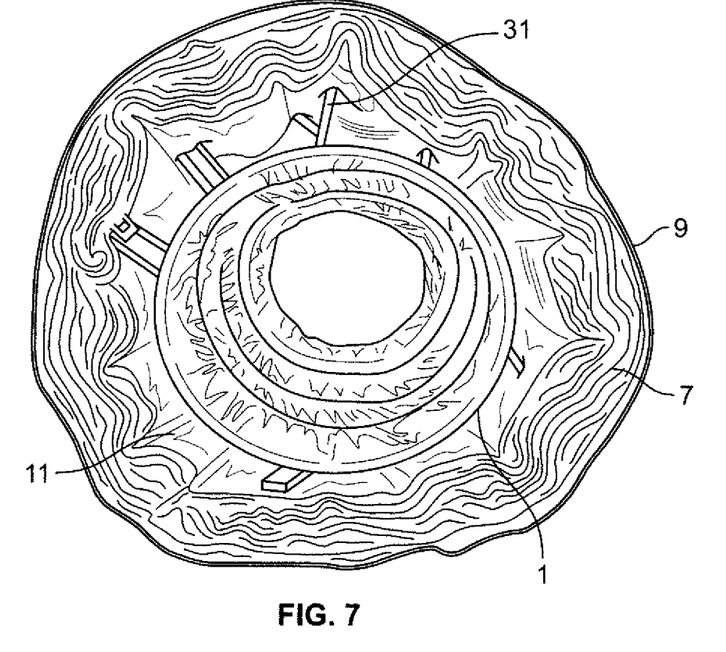
FIG. 7 is an end view of the duct of FIG. 5 surrounded by bulk insulation and an outer jacket surrounding the bulk insulation.

Another spacer design involves the use of staves and is designated by the reference numeral 30. With reference to FIGS. 5-7, this design consists of an inner liner 1 like the one shown in FIG. 1 with the low-e outer surface 3 and helical member 4. Integrated into the inner liner 3 are a plurality of stave spacers 31. The stave spacers 31 are evenly distributed around the outside surface of the liner 1 and along a length thereof as shown in FIG. 5.

The staves can be attached to the liner in any way. They can be individually attached using an adhesive or the like or attached to a film blanket in a spaced apart manner with the film blanket wrapped securely around the liner so that the stave spacers 31 are distributed along the length and circumference of the liner 1.

When the liner is compressed or collapsed, the staves are designed so that they lay down flat against the compressed liner as shown in FIG. 6. When the duct is expanded to its working length, the staves 31 stand up as shown in FIG. 5, thereby creating the generally uniform air gap 11 of FIG. 7. In this configuration, each end of the staves has a flange 32 that would contact either the outer jacket or bulk insulation. Of course, other shapes could be used at the free end of the staves to facilitate supporting the surrounding structure, whether it be just an outer jacket or bulk insulation.

The staves can be manufactured using plastic or metal material. A blanket of fiberglass bulk insulation 7 is then wrapped around the liner and stave assembly which is shown in FIG. 7. An outer jacket 9 is then pulled over the construction to hold the insulation in place as shown in FIG. 7.

The stave design has the same benefits as the other spacer system designs discussed above.

Figure 8:
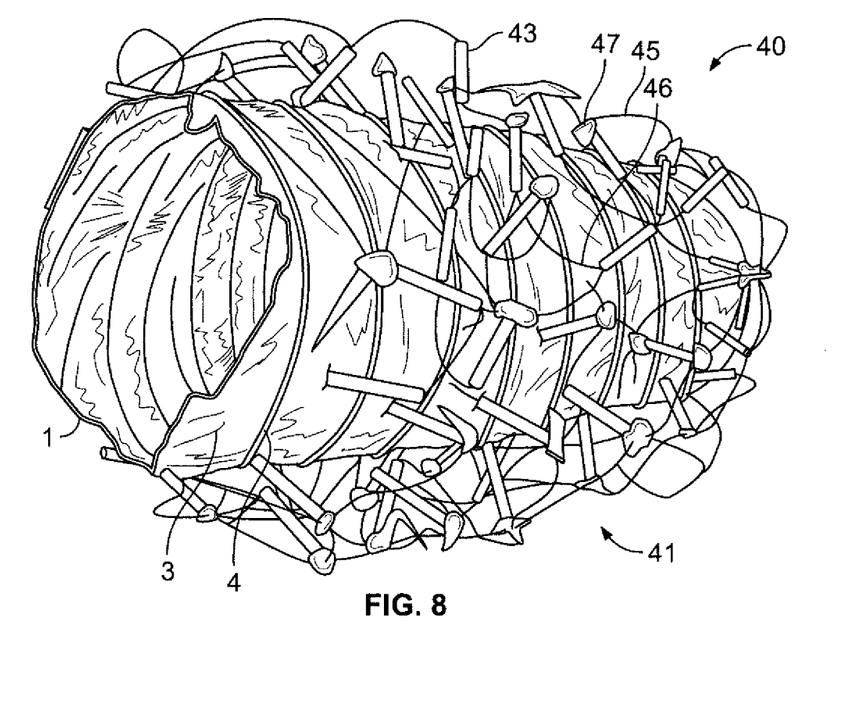
FIG. 8 is perspective view of a fourth embodiment of the inventive duct showing the liner of FIG. 1 with a lattice post and cord construction to create the uniform air gap.
Figure 9A:
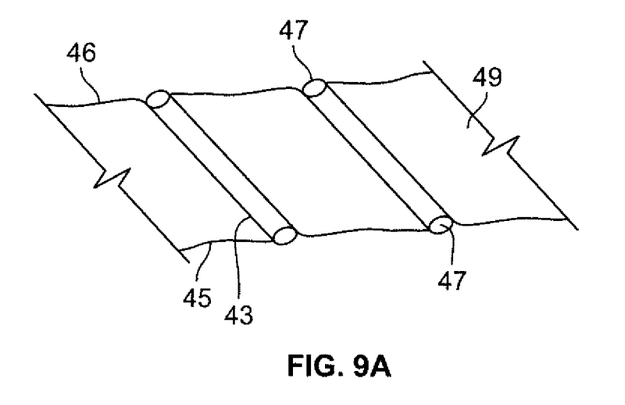
FIG. 9a is a schematic view of the lattice post and cord construction of FIG. 9 in a collapsed state.
Figure 9B:
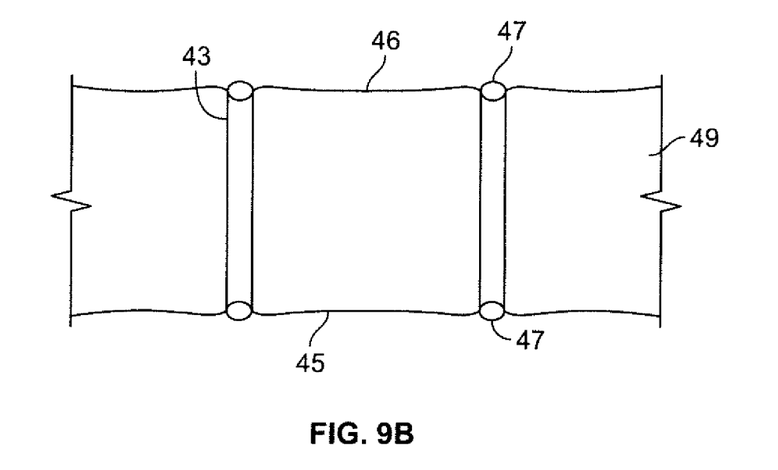
FIG. 9b is a schematic view of the lattice post and cord construction of FIG. 9 is a tensioned state.
Figure 9C:
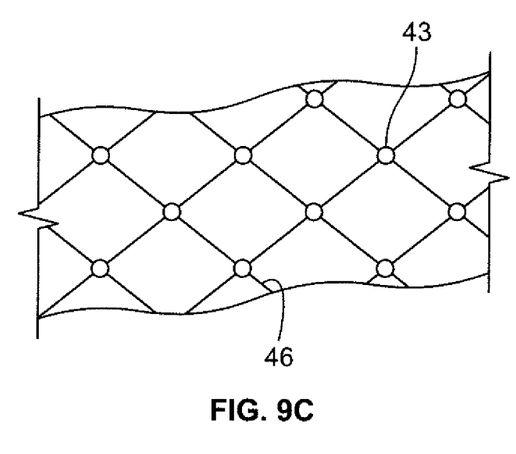
FIG. 9c is a top view of the schematic of the lattice post and cord construction of FIG. 9a showing the one of the lattice network cords and posts.
Figure 10:
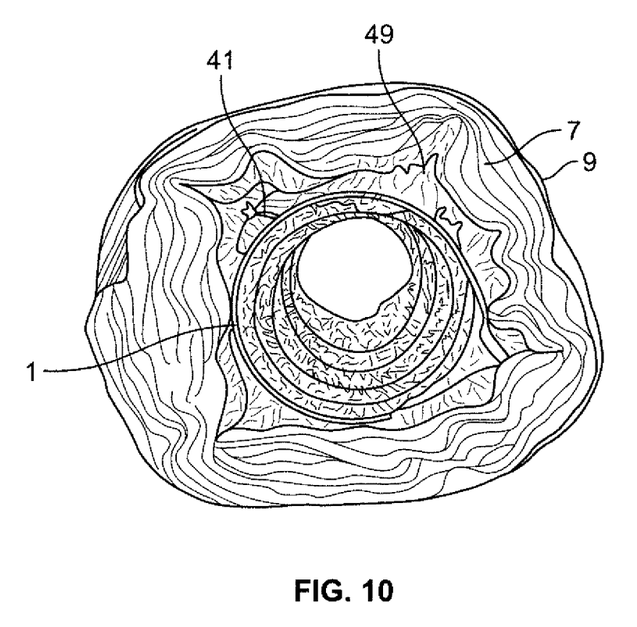
FIG. 10 is an end view of the duct of FIG. 8 surrounded by bulk insulation and an outer jacket.

Yet a further design of the spacer system is designated by the reference numeral 40 and is shown in FIGS. 8-10. This design is a lattice cord and post blanket assembly.

This design consists of an inner liner 1 like that shown in FIG. 1 with its low-e outer surface 3 and helical member 4. A lattice cord and post blanket assembly 41 is wrapped around the inner liner 1. Referring to FIGS. 9a and 9b, the assembly 41 comprises has a number of posts 43 and a pair of lattice cords 45 and 46. The posts 43 are connected between the lattice cords 45 and 46 at connection points 47. The connection can be made in any way, with one way using an adhesive placed on the end of the post 43 to hold the lattice cord in place.

When the lattice cord and post blanket assembly is pulled from one or both ends of the duct that it surrounds, a continuous air gap is formed as the lattice cord is stretched and pulled tight as shown in FIGS. 8 to 10. The lattice cord and post blanket assembly creates a uniform air gap 49 around the liner. The lattice cord and post blanket made up of a series of linked lattice cords can be made of plastic or metal material, that intertwines with the posts that may also be made up of either plastic or metal materials. When the lattice is pulled tight the cord applies tension to the posts which causes them to stand perpendicular to the outer surface of the liner creating the air gap 49 shown in FIG. 9b. FIG. 9a shows the lattice cord assembly in a collapsed state when the assembly is not tensioned. FIG. 9c shows a top view of one of the lattice cords 45 and posts 43 in a vertical orientation.

A blanket of fiberglass bulk insulation 7 is then wrapped around the liner and lattice blanket which is shown in FIG. 10. An outer jacket 9 is then pulled over the construction to hold the insulation in place.

The lattice cord and post blanket assembly may also be utilized between the fiberglass bulk insulation and the outer jacket, with the inner surface of the jacket having a low emissivity reflective surface.

The same benefits as outlined above for the other spacer designs are realized with the lattice cord and post embodiment.

The inventive flexible insulated duct can be used in any application that requires movement of conditioned air and as a substitute for conventional HVAC ducting.

Again, the collapsible nature of the spacer system offers significant advantages in terms of shipping and packaging. The inventive duct creates a significantly reduced package length while containing the same duct length. This is accomplished by the following:

1) the presence of a generally uniform air gap between the inner liner and a fiberglass bulk insulation, when used, better allows the evacuation of air from the insulation during the compression of the product;

2) the flexible nature of the spacer system also allows space for the inner liner to freely move during the compression process (this gap allows for both the layer of insulation and the inner liner to better fold and flatten inside the duct construction); and 3) the presence of the spacer system that holds the insulation against the outer jacket or holds the outer jacket also provides increased crush resistance during the packaging process.

Currently, the current flexible duct industry compresses and packages product in both corrugated boxes and polyethylene bags. Standard ducts come in twenty-five foot lengths ranging from four to twenty-two inch inner diameter product. The industry standard pack height for R4.2 and R6 box and bag product is approximately 20"-25". The industry standard pack height for R8 box and bag product is approximately 25"-30". The collapsible nature of the inventive duct allows for the duct to be compressed and packed in a box or bag of considerably less height (length). In contrast, the current standard flexible duct would have permanent deformation to the liner at a reduced pack height. It has been determined that current industry standard flexible duct can only be compressed and packaged no less than 20"-25" pack height before liner damage occurs. Damage to liner will cause reduced air flow and/or leakage.

Having a reduced pack height allows for increased skid capacity for box and bag product. This increased capacity allows for more inventive duct to be loaded and shipped on containers to the customer. Typically, flexible duct freight cost is approximately 8% of the total product cost of sales, so the reduced package height offers a significant savings to the flexible duct manufacturer.

A reduced pack height also allows for the customer to utilize less warehouse space to store the product before being used. Flexible duct is typically the lowest value item for HVAC equipment that is stored in a distributor's warehouse. Given the fact that this product is can occupy less space in the warehouse the distributor has more space for higher value product to stock.

The reduced compression and overall duct package length also means that there is less package material being used for the total package. This ensures that less corrugated box and polyethylene bag is used per packaged duct, thereby resulting in less packaging material cost for the product. The advantages in terms of less packaging material, less weight for transportation, and less warehouse space also result in a smaller environmental footprint.

The presence of the generally uniform gap also allows the duct to recover faster than conventional ducts. As noted above, the duct is in a compressed form when made and delivered to an installation site. Once the packaging is open, the duct has to recover or expand sufficiently before it is ready for installation. The air gap of the inventive duct allows air to more easily infiltrate the duct and accelerate the recovery or expansion of the duct. This leads to improved productivity during duct installation as the installer does not have to wait as long for the duct to recover.

For Class 1 flexible ducts, the duct material would be tested to and comply with UL 181 standards, which includes flame resistance at a minimum to pass the Flame Penetration test method in UL 181.

As such, an invention has been disclosed in terms of preferred embodiments thereof which fulfills each and every one of the objects of the present invention as set forth above and provides a new and improved insulated flexible duct and method of use.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. An insulated flexible duct comprising:
   a liner;
   a reflective insulation system surrounding the liner, and
   at least one jacket surrounding the reflective insulation system,
   the reflective insulation system further comprising:
   at least one low emissivity reflective surface; and
   at least one spacer system positioned between the liner and the jacket, the spacer system creating a generally uniform air gap between an outer surface of the liner and the inner surface of the jacket to create additional R value for the flexible insulated duct; wherein the spacer system further comprises an expandable lattice blanket positioned between the outer surface of the liner and the inner surface of the at least one jacket to create the generally uniform air gap between the outer surface of the liner and the inner surface of the at least one jacket.

2. The flexible insulated duct of claim 1, wherein at least one bulk insulating layer is positioned between:
   an outer periphery of the at least one spacer system and the inner surface of the jacket such that the generally uniform air gap is created between the outer surface of the liner and an inner surface of the at least one bulk insulating layer; or
   an outer periphery of the liner and an inner periphery of at least one spacer system such that the generally uniform air gap is created between an outer surface of the at least one bulk insulating layer and an inner surface of the at least one jacket.

3. The flexible insulated duct of claim 2, further comprising a plurality of the at least one spacer system and the at least one bulk insulating layers arranged to create a plurality of generally uniform air gaps.

4. The flexible insulated duct of claim 1, further comprising a plurality of the at least one spacer system and the at least one jacket arranged to create a plurality of generally uniform air gaps.

5. The flexible insulated duct of claim 1, wherein the liner comprises a pair of polymer films, one polymer film forming an inner surface of the liner and the other polymer film forming the outside surface of the liner and, optionally a helical member disposed between the polymer films.

6. The flexible insulated duct of claim 1, wherein the jacket further comprises either two layers of polyester film that are adhered together, the two layers encapsulating a scrim blanket therebetween or a continuous tube of polyethylene material.

7. The flexible insulated duct of claim 1, wherein the at least one low emissivity surface is on either an inner surface of the at least one jacket or the outer surface of the liner.

8. A method of supplying conditioned air to a space comprising:
providing the flexible insulated duct of claim 1; and
passing conditioned air through the flexible insulated duct to a space.

9. The flexible insulated duct of claim 1, wherein the expandable lattice blanket includes interconnected lattice walls, the lattice walls extending from an outer surface of the liner and forming a plurality of air pocket compartments.

10. An insulated flexible duct comprising:
a liner;
a reflective insulation system surrounding the liner, and
at least one jacket surrounding the reflective insulation system,
the reflective insulation system further comprising:
at least one low emissivity reflective surface; and
at least one spacer system positioned between the liner and the jacket, the spacer system creating a generally uniform air gap between an outer surface of the liner and the inner surface of the jacket to create additional R value for the flexible insulated duct; wherein the spacer system further comprises an expandable lattice blanket positioned between the outer surface of the liner and the inner surface of the at least one jacket to create the generally uniform air gap between the outer surface of the liner and the inner surface of the at least one jacket,
wherein the expandable lattice blanket is made of a sheet of foam with openings therein wherein expansion of the sheet of foam creates lattice openings or strips of foam connected together at spaced apart locations to create the lattice openings.

* * * * *